(12) United States Patent
Konishi et al.

(10) Patent No.: US 9,850,343 B2
(45) Date of Patent: Dec. 26, 2017

(54) METHOD FOR PRODUCING LIQUID CRYSTALLINE POLYESTER, AND LIQUID CRYSTALLINE POLYESTER

(71) Applicant: TORAY Industries, Inc., Tokyo (JP)

(72) Inventors: Akito Konishi, Nagoya (JP);
Mitsushige Hamaguchi, Nagoya (JP);
Hideyuki Umetsu, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/900,437

(22) PCT Filed: Jul. 25, 2014

(86) PCT No.: PCT/JP2014/069652
§ 371 (c)(1),
(2) Date: Dec. 21, 2015

(87) PCT Pub. No.: WO2015/016141
PCT Pub. Date: Feb. 5, 2015

(65) Prior Publication Data
US 2016/0145380 A1 May 26, 2016

(30) Foreign Application Priority Data

Jul. 31, 2013 (JP) ................ 2013-158973

(51) Int. Cl.
C09K 19/38 (2006.01)
C08G 63/60 (2006.01)
C08G 63/78 (2006.01)

(52) U.S. Cl.
CPC ........... *C08G 63/605* (2013.01); *C08G 63/78* (2013.01); *C09K 19/3809* (2013.01)

(58) Field of Classification Search
CPC .. C09K 19/3809; C08G 63/065; C08G 63/78; C08G 63/605
See application file for complete search history.

(56) References Cited

U.S. PATENT DOCUMENTS

| | | | |
|---|---|---|---|
| 5,731,401 A | 3/1998 | Gupta et al. | |
| 6,296,930 B1 | 10/2001 | Ohbe et al. | |
| 7,087,704 B2 | 8/2006 | Kanaka et al. | |
| 2005/0215754 A1* | 9/2005 | Kanaka | C08G 63/87 528/272 |
| 2007/0243376 A1 | 10/2007 | Tachikawa et al. | |

FOREIGN PATENT DOCUMENTS

| | | |
|---|---|---|
| JP | 63-199223 A | 8/1988 |
| JP | 64-60627 A | 3/1989 |
| JP | 64-60628 A | 3/1989 |
| JP | 6-306156 A | 11/1994 |
| JP | 7-207011 A | 8/1995 |
| JP | 2000-80254 A | 3/2000 |
| JP | 2003-165831 A | 6/2003 |
| JP | 2004-256656 A | 9/2004 |
| JP | 2005-272776 A | 10/2005 |
| JP | 2007-23132 A | 2/2007 |
| JP | 2008-240229 A | 10/2008 |
| JP | 2009-221406 A | 10/2009 |

OTHER PUBLICATIONS

English translation for JP 2008/240229 provided by Espacenet.*
International Search Report issued in PCT/JP2014/069652, dated Aug. 19, 2014.
Written Opinion of the International Searching Authority issued in PCT/JP2014/069652, dated Aug. 19, 2014.

* cited by examiner

*Primary Examiner* — Chanceity Robinson
(74) *Attorney, Agent, or Firm* — Birch, Stewart, Kolasch & Birch, LLP

(57) ABSTRACT

The present invention is a method for producing a liquid crystalline polyester, which comprises reacting an aromatic hydroxycarboxylic acid, a diol containing 70 mol % or more of an aromatic diol having a structural unit (I) as shown below and an aromatic dicarboxylic acid with one another in the presence of an acylating agent and an aliphatic sulfonic acid represented by formula (A) shown below. (wherein Ar represents a bivalent aromatic group which is an aromatic hydrocarbon group and has a molecular weight of less than 200) Formula (A) R—SO$_3$H (wherein R represents an alkyl group having 1 to 12 carbon atoms) According to the present invention, a liquid crystalline polyester, which can be molded into an article having excellent tensile strength and excellent creep properties and from which a gas is generated in a reduced amount, can be produced with high efficiency.

14 Claims, No Drawings

METHOD FOR PRODUCING LIQUID CRYSTALLINE POLYESTER, AND LIQUID CRYSTALLINE POLYESTER

TECHNICAL FIELD

The present invention relates to a method for producing a liquid crystalline polyester, and to a liquid crystalline polyester. More specifically, the present invention relates to an efficient method for producing a liquid crystalline polyester having excellent tensile strength and creep properties, and to a liquid crystalline polyester obtained by the method.

BACKGROUND ART

In recent years, performance improvement of plastics has been increasingly demanded, and a number of polymers having various properties have been developed and offered to the market. In particular, liquid crystalline resins such as liquid crystalline polyesters having optical anisotropy, which are characterized by parallel arrangement of molecular chains, are attracting attention from the viewpoint of excellent moldability and mechanical properties, as well as insulation properties. Their use is expanding to electric/electronic parts and machine parts.

In particular, liquid crystalline polyesters composed of aromatic skeletons have especially excellent moldability, mechanical properties, and insulation properties. For example, for improvement of the melt moldability, liquid crystalline polyesters using aromatic diols in which nitrogen, sulfur, or phosphorus is contained and high-molecular-weight aromatic diols have been proposed (see, for example, Patent Documents 1 to 3). On the other hand, methods for producing liquid crystalline polymers in which aromatic sulfonic acids as catalysts are added to suppress generation of gas such as phenol gas, thereby suppressing resin color changes due to heat deterioration (for example, Patent Document 4), methods for producing copolymerized polyesters having specific structures in the presence of a sulfonic acid-based catalyst for improving heat resistance and mechanical properties (for example, Patent Document 5), and methods for producing liquid crystalline polyesters having specific structures for improving fluidity and retention stability (see, for example, Patent Document 6), have been proposed.

PRIOR ART DOCUMENTS

Patent Documents

[Patent Document 1] JP 1-60627 A
[Patent Document 2] JP 1-60628 A
[Patent Document 3] JP 2007-23132 A
[Patent Document 4] U.S. Pat. No. 7,087,704 B
[Patent Document 5] JP 6-306156 A
[Patent Document 6] JP 2004-256656 A

SUMMARY OF THE INVENTION

Problems to be Solved by the Invention

Recently, on the other hand, electric/electronic parts and machine parts are being increasingly thinned and complicated in terms of their shapes as improvements of performances, increases in the output, compaction, and weight saving of devices proceed, so that higher tensile strength and creep properties are demanded. Nevertheless, the techniques of Patent Documents 1 to 6 failed to achieve sufficient suppression of gas generation, and to achieve sufficient tensile strength and creep properties.

An object of the present invention is to provide an efficient method for producing a liquid crystalline polyester whose molded products are excellent in the tensile strength and creep properties, and generate less gas; and a liquid crystalline polyester obtained by the method and having excellent characteristics.

Means for Solving the Problems

The present inventors intensively studied to solve the problems described above, and, as a result, discovered that a liquid crystalline polyester whose molded products are excellent in the tensile strength and creep properties, and generate less gas, can be efficiently obtained by addition of a specific aliphatic sulfonic acid(s).

That is, the present invention was made in order to solve at least a part of the above-described problems, and modes of the present invention may comprise at least a part of the following constitutions.

(1) A method for producing a liquid crystalline polyester, the method comprising reacting an aromatic hydroxycarboxylic acid(s), a diol(s) containing an aromatic diol having the following structural unit (I) in an amount of not less than 70 mol %, and an aromatic dicarboxylic acid(s) with an acylating agent in the presence of an aliphatic sulfonic acid(s) represented by the Formula (A) below.

[Chemical Formula 1]

$$\text{─}(\text{O}\text{─}\text{Ar}\text{─}\text{O})\text{─} \qquad (I)$$

(wherein Ar has a molecular weight of less than 200 and is a divalent aromatic hydrocarbon group)

$$\text{R}\text{─}\text{SO}_3\text{H} \text{ (R: } C_1\text{-}C_{12} \text{ alkyl group)} \qquad \text{Formula (A)}$$

(2) The method for producing a liquid crystalline polyester according to (1), wherein the aliphatic sulfonic acid(s) is/are added before beginning of deacylated polycondensation reaction.

(3) The method for producing a liquid crystalline polyester according to (1) or (2), wherein the aliphatic sulfonic acid(s) is/are added when the liquid temperature in the reaction vessel is not more than 130° C.

(4) The method for producing a liquid crystalline polyester according to any one of (1) to (3), wherein 0.0005 part by weight to 0.1 part by weight of the aliphatic sulfonic acid(s) is/are added to a total of 100 parts by weight of the aromatic hydroxycarboxylic acid(s), diol(s), and aromatic dicarboxylic acid(s).

(5) The method for producing a liquid crystalline polyester according to any one of (1) to (4), wherein the aromatic diol is a compound having the following structural unit (IV).

[Chemical Formula 2]

(IV)

(6) The method for producing a liquid crystalline polyester according to any one of (1) to (5), wherein
the aromatic hydroxycarboxylic acid is a compound having the following structural unit (II);
the aromatic diol is a compound having the following structural unit (III), and a compound having the following structural unit (IV); and
the aromatic dicarboxylic acid is a compound having the following structural unit (V), and a compound having the following structural unit (VI).

[Chemical Formula 3]

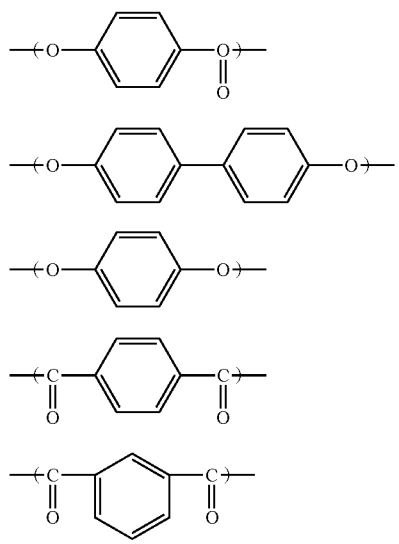

(7) The method for producing a liquid crystalline polyester according to any one of (1) to (6), wherein the obtained liquid crystalline polyester is a liquid crystalline polyester in which
the structural unit (II) is contained in an amount of 65 to 80 mol % with respect to the total of the structural units (II), (III), and (IV);
the structural unit (III) is contained in an amount of 55 to 85 mol % with respect to the total of the structural units (III) and (IV);
the structural unit (V) is contained in an amount of 50 to 90 mol % with respect to the total of the structural units (V) and (VI); and
the total of the structural units (III) and (IV) is substantially equimolar to the total of the structural units (V) and (VI).
(8) The method for producing a liquid crystalline polyester according to any one of (1) to (7), wherein the aliphatic sulfonic acid is methanesulfonic acid and/or ethanesulfonic acid.
(9) A liquid crystalline polyester comprising a structural unit derived from an aromatic diol represented by the following structural unit (I) in an amount of not less than 70 mol % with respect to 100 mol % of structural units derived from the entire diol, wherein the rate of weight loss after heating as observed by keeping under nitrogen atmosphere at a temperature of the melting point of the liquid crystalline polyester+20° C. for 30 minutes is not more than 0.1 wt %.

[Chemical Formula 4]

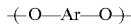     (I)

(10) The liquid crystalline polyester according to (9), wherein the liquid crystalline polyester has the structural unit (IV).

[Chemical Formula 5]

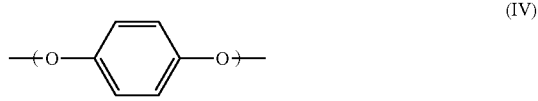

(11) A liquid crystalline polyester resin composition comprising 10 to 200 parts by weight of a filler with respect to 100 parts by weight of the liquid crystalline polyester according to (9) or (10).
(12) A molded product produced by molding the liquid crystalline polyester according to (9) or (10), or the liquid crystalline polyester resin composition according to (11).

Effect of the Invention

By the method for producing a liquid crystalline polyester of the present invention, a liquid crystalline polyester whose molded products are excellent in the tensile strength and creep properties, and generate less gas, can be efficiently obtained. Such a resin is suitable for electric/electronic parts and machine parts.

Mode for Carrying Out the Invention

The present invention is described below in more detail. The weight as used herein means the mass.
The liquid crystalline polyester as a mode of the present invention is a polyester that forms an anisotropic molten phase. The liquid crystalline polyester of the present invention comprises as constituting components an aromatic hydroxycarboxylic acid, aromatic diol, and aromatic dicarboxylic acid. Specific examples thereof are described later.
In the method for producing a liquid crystalline polyester in the modes of the present invention, an aromatic hydroxycarboxylic acid(s), a diol(s) containing an aromatic diol having the following structural unit (I) in an amount of not less than 70 mol %, and an aromatic dicarboxylic acid(s) are reacted with an acylating agent in the presence of an aliphatic sulfonic acid(s) represented by the Formula (A) below.

[Chemical Formula 6]

     (I)

(wherein Ar is an aromatic group which is an aromatic hydrocarbon group having a molecular weight of less than 200)

R—SO$_3$H (R: C$_1$-C$_{12}$ alkyl group)     Formula (A)

In cases where a diol(s) containing an aromatic diol having the following structural unit (I) in an amount of less than 70 mol % with respect to the entire diol used for the reaction is/are used, and, for example, ethylene glycol is used in an amount of not less than 30 mol %, the amount of gas generated from the resulting liquid crystalline polyester increases. Therefore, when a resin composition is produced by mixing of a filler and the like, adhesion of the liquid crystalline polyester to the filler decreases, leading to large decreases in the tensile strength and creep properties of the molded product. It is preferred to use a diol(s) containing an aromatic diol having the structural unit (I) in an amount of not less than 80 mol %.

In cases of a bulky monomer wherein the molecular weight of Ar in the aromatic diol having the structural unit (I) is not less than 200, and in cases where Ar is not a divalent aromatic hydrocarbon group, for example, in cases where Ar contains nitrogen, sulfur, and phosphorus atoms, reactivity of the aromatic diol decreases, and the terminal-group balance of the resulting liquid crystalline polyester changes. This causes an increase in the amount of gas generated, and, in cases where a filler and the like are added to produce a resin composition, adhesion of the liquid crystalline polyester to the filler decreases, leading to large decreases in the tensile strength and creep properties of the molded product. The molecular weight of Ar herein means the molecular weight of Ar in which the dioxy unit is substituted. For example, in cases of hydroquinone, the molecular weight of Ar is 76.

More specifically, the method for producing a liquid crystalline polyester in the modes of the present invention is a method in which materials of a liquid crystalline polyester are reacted with an acylating agent to cause acylation of hydroxyl groups of an aromatic hydroxycarboxylic acid(s) and/or a diol(s), followed by reacting the resulting acylated compound(s) with an aromatic dicarboxylic acid(s), thereby allowing deacylated polycondensation reaction, wherein the method is carried out in the presence of an aliphatic sulfonic acid(s) represented by Formula (A). The deacylated polycondensation reaction is preferably followed by melt polymerization wherein the reaction is allowed to proceed under reduced pressure at a temperature at which the liquid crystalline polyester is melt, thereby completing the polycondensation reaction. Melt polymerization is a method which is advantageous for producing a uniform liquid crystalline polyester, and preferred from the viewpoint of producing a liquid crystalline polyester which generates less gas and whose molded products are excellent in the tensile strength and creep properties.

For example, the method is preferably a method in which predetermined amounts of an aromatic hydroxycarboxylic acid(s), a diol(s) containing an aromatic diol having the structural unit (I) in an amount of not less than 70 mol %, and an aromatic dicarboxylic acid(s), as well as an acylating agent, are fed into a reaction vessel equipped with a stirring blade, a distillation pipe, and, in its lower part, a discharge outlet, and the resulting mixture is stirred under heat under nitrogen atmosphere, while an aliphatic sulfonic acid(s) represented by Formula (A) is/are added thereto at least before the beginning of the deacylated polycondensation reaction, followed by increasing the temperature to the melting temperature of the liquid crystalline polyester and allowing polycondensation to proceed under reduced pressure, thereby completing the reaction. The acylating agent may be fed together with the materials of the liquid crystalline polyester, or may be separately added. Since the acylating agent is preferably present in the reaction system during the acylation reaction, the acylating agent is preferably fed to the reaction vessel within the temperature range in which the acylation reaction occurs. More specifically, the acylating agent is preferably added when the liquid temperature in the reaction vessel is not more than 210° C., more preferably added when the liquid temperature in the reaction vessel is not more than 130° C. Each temperature mentioned below indicates the liquid temperature in the reaction vessel. The method for measuring the liquid temperature is described later.

The method for producing a liquid crystalline polyester of the present invention comprises an acylation reaction in which phenolic hydroxyl groups of the aromatic hydroxycarboxylic acid(s) and/or the diol(s) are reacted with an acylating agent. In cases where the acylation reaction is not included, for example, in cases where acylated monomers are used, reactivity in the initial phase of the deacylated polycondensation reaction described later changes, leading to an increase in the amount of gas generated from the resulting liquid crystalline polyester. This causes a decrease in adhesion of the liquid crystalline polyester to a filler when the filler and the like are added for production of a resin composition, resulting in large decreases in the tensile strength and creep properties of the molded product. Usually, the acylation reaction temperature is preferably not less than 130° C. The acylation reaction temperature is preferably not more than 210° C., more preferably not more than 180° C., still more preferably not more than 150° C. In cases where the acylation reaction temperature is within the above-described range, the acylation reaction sufficiently proceeds, and therefore the generation of gas from the liquid crystalline polyester can be suppressed, leading to improvement of the tensile strength and creep properties of the molded product. Usually, the acylation reaction time is preferably not less than 5 minutes. The acylation reaction time is preferably not more than 6 hours, more preferably not more than 2 hours. In cases where the acylation reaction time is within the above-described range, the generation of gas from the liquid crystalline polyester can be suppressed, and, when the filler and the like are added to produce a resin composition, the tensile strength and creep properties of the molded product can be improved. The acylation reaction may be carried out under normal pressure, or may be carried out under pressure.

The deacylated polycondensation reaction is a reaction that occurs after the acylation reaction and continues until the beginning of the polycondensation under reduced pressure. In the deacylated polycondensation reaction, the reaction is preferably begun at 180 to 240° C., usually preferably under normal pressure. In cases where acetic anhydride is used as the acylating agent, distillation of acetic acid occurs. The reaction time of the deacylated polycondensation reaction is usually 1.5 to 8 hours, preferably 1.5 to 6 hours. The acylation reaction and the deacylated polycondensation reaction are preferably carried out under an atmosphere of an inert gas.

Thereafter, polycondensation under reduced pressure is preferably carried out under conditions where the pressure is reduced. Usually, the reaction temperature of the polycondensation under reduced pressure is preferably from the melting point–30° C. to the melting point+50° C. of the resulting liquid crystalline polyester. The reaction temperature is preferably from the melting point to the melting point+30° C. For example, the reaction temperature is within the range of 270 to 365° C. The reaction time of the polycondensation under reduced pressure is usually 30 minutes to 6 hours, preferably 30 minutes to 3 hours. The degree of reduction of the pressure during the polycondensation under reduced pressure is usually 0.1 mmHg (13.3 Pa) to 20 mmHg (2660 Pa), preferably not more than 10 mmHg (1330 Pa), more preferably not more than 5 mmHg (665 Pa).

The acylation reaction, the deacylated polycondensation reaction, and the polycondensation under reduced pressure may be continuously carried out in the same reaction vessel, or may be carried out in different reaction vessels. A reaction vessel equipped with a stirring blade, a distillation pipe, and, in its lower part, a discharge outlet, may be used.

The reaction time within the temperature range of 130° C. to 270° C. is preferably 120 to 340 minutes. The reason why the temperature range of 130° C. to 270° C. is noticed is that this temperature range corresponds to the temperature range for the acylation reaction and the first half of the deacylated polycondensation reaction, which are important for suppression of the amount of gas generated from the resulting liquid crystalline polyester, and that, by reducing their reaction time, a remarkable effect to suppress the amount of gas generated can be exhibited. In cases where the reaction time is longer than 120 minutes, generation of gas from the resulting liquid crystalline polyester can be suppressed, and the tensile strength and creep properties of the molded product can be improved. The reaction time is more preferably not less than 150 minutes. In cases where the reaction time is shorter than 340 minutes, the reaction time can be reduced, and the productivity can therefore be increased. In addition, generation of gas from the resulting liquid crystalline polyester can be suppressed, and the tensile strength and creep properties of the molded product can be improved. The reaction time is more preferably not more than 280 minutes, especially preferably not more than 230 minutes.

Examples of the acylating agent include aliphatic or aromatic carboxylic acid anhydrides. The acylating agent is preferably a lower aliphatic carboxylic acid anhydride whose carbon number is not more than 10, such as acetic anhydride or propionic anhydride, especially acetic anhydride. The amount of the acylating agent used is preferably 1.00 to 1.20 molar equivalents with respect to the total of the phenolic hydroxyl groups in the materials of the liquid crystalline polyester. The amount of the acylating agent used is more preferably 1.03 to 1.16 molar equivalents.

The aliphatic sulfonic acid represented by Formula (A) used in the present invention is preferably added at least before the beginning of the deacylated polycondensation reaction. More specifically, since the deacylated polycondensation reaction is preferably begun at 180° C. to 240° C., the aliphatic sulfonic acid is added at a liquid temperature in the reaction vessel of preferably not more than 240° C., more preferably not more than 180° C. By the addition at a temperature within the above-described range, the reaction time of the deacylated polycondensation reaction can be reduced, and the productivity can therefore be increased. In addition, generation of gas from the resulting liquid crystalline polyester can be suppressed, and the tensile strength and creep properties of the molded product can be improved. Since the acylation reaction is preferably carried out at not less than 130° C., the sulfonic acid catalyst is more preferably added at a liquid temperature in the reaction vessel of not more than 130° C. By the addition at a temperature of not more than 130° C., the reaction times of not only the deacylated polycondensation reaction, but also the acylation reaction can be reduced, and the productivity can therefore be increased. In addition, generation of gas from the resulting liquid crystalline polyester can be suppressed, and the tensile strength and creep properties of the molded product can be improved. The liquid temperature in the reaction vessel can be measured using, for example, a thermocouple inserted below the reaction liquid surface from the outside of the reaction vessel. The aliphatic sulfonic acid represented by Formula (A) may be added before the acylation reaction, together with the materials, or together with the acylating agent.

R in Formula (A) represents a $C_1$-$C_{12}$ alkyl group. R is preferably a $C_1$-$C_6$ alkyl group. By addition of such an aliphatic sulfonic acid, generation of gas from the resulting liquid crystalline polyester can be suppressed, and the tensile strength and creep properties of the molded product can be improved. In cases where the polymerization is carried out under noncatalytic conditions, the reaction time cannot be reduced. The reaction time herein means the reaction time from the acylation reaction to the beginning of the polycondensation under reduced pressure. In cases where the catalyst represented by Formula (A) is not used, the reaction time may be long. In cases where the reaction time from the acylation reaction to the beginning of the polycondensation under reduced pressure is reduced without using the catalyst, reactivity in the acylation reaction and the deacylated polycondensation reaction may be low, so that monomers may remain unreacted, resulting in sublimation of the monomers and hence bumping. The sublimation of the monomers causes imbalance of the terminal groups, resulting in generation of a large amount of gas.

In cases where the compound corresponding to Formula (A) is not added, the effect to promote the acylation reaction and the deacylated polycondensation reaction is small, and reduction of the reaction time causes a sharp increase in the reaction temperature and hence bumping during the polymerization, resulting in generation of gas. In addition, the catalyst remains in the liquid crystalline polyester obtained after the polymerization, and acts as an impurity to deteriorate the tensile strength of the molded product. During kneading of such a liquid crystalline polyester with a filler to produce a resin composition, gas is generated from the liquid crystalline polyester, leading to a decrease in adhesion of the liquid crystalline polyester to the filler, resulting in large decreases in the tensile strength and creep properties of the molded product.

Methanesulfonic acid and/or ethanesulfonic acid is/are more preferred from the viewpoint of producing a liquid crystalline polyester wherein the generation of gas from the obtained liquid crystalline polyester is suppressed, and the tensile strength and creep properties of the molded product are increased. Two or more kinds of aliphatic sulfonic acids may be used as long as the aliphatic sulfonic acids satisfy Formula (A).

The aliphatic sulfonic acid(s) represented by Formula (A) used in the present invention is/are preferably added in an amount of 0.0005 part by weight to 0.1 part by weight with respect to a total of 100 parts by weight of the aromatic hydroxycarboxylic acid(s), the diol(s), and the aromatic dicarboxylic acid(s), which are materials of the liquid crystalline polyester. In cases where the amount of the aliphatic sulfonic acid(s) represented by Formula (A) is not less than 0.0005 part by weight, the reaction time can be reduced, and the productivity can therefore be increased. In addition, generation of gas from the resulting liquid crystalline polyester can be suppressed, and the tensile strength and creep properties of the molded product can be improved. The amount is more preferably not less than 0.001 part by weight. On the other hand, in cases where the amount of the aliphatic sulfonic acid(s) represented by Formula (A) added is not more than 0.1 part by weight, the aliphatic sulfonic acid(s) is/are discharged to the outside of the system upon completion of the polymerization, and the amount of the aliphatic sulfonic acid(s) remaining in the reaction system is small. Thus, generation of gas from the resulting liquid crystalline polyester can be suppressed, and the tensile strength and creep properties of the molded product can be improved. The amount is more preferably not more than 0.07 part by weight, still more preferably not more than 0.05 part by weight.

The acid dissociation constant (pKa) of the aliphatic sulfonic acid represented by Formula (A) used in the present invention is preferably −2 to 1. In cases where the acid dissociation constant (pKa) of the aliphatic sulfonic acid is not less than −2, an appropriate acidity can be achieved, and therefore the reaction is not promoted too much. Thus, generation of gas from the resulting liquid crystalline polyester can be suppressed, and the tensile strength and creep properties of the molded product can be improved. By using a strongly acidic aliphatic sulfonic acid having an acid dissociation constant (pKa) of not more than 1, the reaction time can be reduced, and the productivity can therefore be increased. In addition, generation of gas from the resulting liquid crystalline polyester can be suppressed, and the tensile strength and creep properties of the molded product can be improved. The acid dissociation constant is more preferably not more than 0.

Examples of the method for measuring pKa include a method in which an aqueous aliphatic sulfonic acid solution is titrated with a titrant such as sodium hydroxide at 25° C., and pKa is calculated from the pH value at the time point when 50% neutralization was achieved.

In the method for producing a liquid crystalline polyester of the present invention, the reaction may be carried out in the presence of one or more of catalysts other than the aliphatic sulfonic acid(s) represented by Formula (A), such as Brønsted acids including hydrogen chloride, and metal compounds including stannous acetate, tetrabutyl titanate, potassium acetate, sodium acetate, sodium hypophosphite, antimony trioxide, and magnesium metal.

The obtained liquid crystalline polyester can be discharged in a strand-like shape from the discharge outlet provided in the lower part of the reaction vessel, by pressurizing the inside of the reaction vessel at, for example, about 1.0 kg/cm² (0.1 MPa) at a temperature at which the liquid crystalline polyester melts.

In the method for producing a liquid crystalline polyester of the present invention, the polycondensation under reduced pressure may be followed by solid phase polymerization to complete the polycondensation reaction. For example, the method of the solid phase polymerization may be a method in which the polymer of the liquid crystalline polyester is pulverized using a pulverizer, and the resulting pulverized polymer is heated under nitrogen flow or under reduced pressure at a temperature within the range of the liquid crystallization start temperature of the liquid crystalline polyester−10 to −20° C. (for example, 100 to 300° C.) for 1 to 50 hours to allow polycondensation to a desired degree of polymerization, thereby completing the reaction. Solid phase polymerization is an advantageous method for production of a polymer with a high degree of polymerization.

The structural units constituting the liquid crystalline polyester of the present invention are described below.

The liquid crystalline polyester of the present invention is obtained by reacting an aromatic hydroxycarboxylic acid(s), a diol(s) containing an aromatic diol having the following structural unit (I) in an amount of not less than 70 mol %, and an aromatic dicarboxylic acid(s). The liquid crystalline polyester of the present invention is preferably constituted by the following structural units (II) to (VI).

[Chemical Formula 7]

(I)

(Ar has a molecular weight of less than 200 and is a divalent aromatic hydrocarbon group.)

-continued

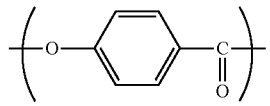

(II)

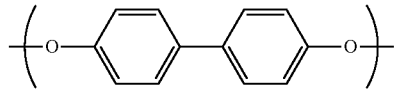

(III)

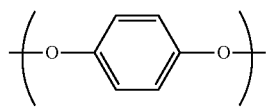

(IV)

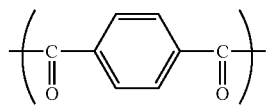

(V)

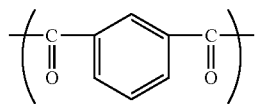

(VI)

Specific examples of the aromatic hydroxycarboxylic acid include p-hydroxybenzoic acid, m-hydroxybenzoic acid, and 6-hydroxy-2-naphthoic acid. In particular, the aromatic hydroxycarboxylic acid is preferably a compound having the structural unit (II) from the viewpoint of efficiently producing a liquid crystalline polyester which generates less gas and whose molded products are excellent in the tensile strength and creep properties. More specifically, the aromatic hydroxycarboxylic acid is preferably p-hydroxybenzoic acid.

Specific examples of the aromatic diol having the structural unit (I) include 4,4'-dihydroxybiphenyl, hydroquinone, resorcinol, t-butylhydroquinone, phenylhydroquinone, chlorohydroquinone, 2,6-dihydroxynaphthalene, 2,7-dihydroxynaphthalene, 3,4'-dihydroxybiphenyl, 2,2-bis(4-hydroxyphenyl)propane, 4,4'-dihydroxydiphenyl ether, and 4,4'-dihydroxybenzophenone. From the viewpoint of producing a liquid crystalline polyester which generates less gas and whose molded products are excellent in the tensile strength and creep properties, aromatic diols having no substituent are preferred. 4,4'-Dihydroxybiphenyl, hydroquinone, and 2,6-dihydroxynaphthalene are more preferred. In particular, the aromatic diol is preferably a compound having the structural unit (IV), and it is preferred to use a compound having the structural unit (III) and a compound having the structural unit (IV) in combination. More specifically, the compound having the structural unit (III) is preferably 4,4'-dihydroxybiphenyl, and the compound having the structural unit (IV) is preferably hydroquinone. By using compounds having such structures, generation of gas can be suppressed, and a liquid crystalline polyester having excellent tensile strength and creep properties can be produced. In the present invention, a diol(s) containing an aromatic diol having the structural unit (I) in an amount of not less than 70 mol % with respect to the total diol is/are used. As long as the above conditions are satisfied, and within the range in which the effect of the present invention is not deteriorated, diols other than the aromatic diol having the structural unit (I) are not limited.

Specific examples of the aromatic dicarboxylic acid include terephthalic acid, isophthalic acid, 2,6-naphthalenedicarboxylic acid, 4,4'-diphenyldicarboxylic acid, 3,3'-diphenyldicarboxylic acid, 2,2'-diphenyldicarboxylic acid, 1,2-bis(phenoxy)ethane-4,4'-dicarboxylic acid, 1,2-bis(2-chlorophenoxy)ethane-4,4'-dicarboxylic acid, and 4,4'-diphenylether dicarboxylic acid. From the viewpoint of suppressing generation of gas from the resulting liquid crystalline polyester, and improving the tensile strength and creep properties of the molded product, terephthalic acid, isophthalic acid, 2,6-naphthalenedicarboxylic acid are preferred. A compound having the structural unit (V) and/or a compound having the structural unit (VI) is/are preferred, and use of the combination of a compound having the structural unit (V) and a compound having the structural unit (VI) is preferred. More specifically, terephthalic acid and isophthalic acid are especially preferred.

Further, a structural unit(s) produced from p-aminobenzoic acid, p-aminophenol, and/or the like may be added within the range in which the liquid crystallinity or the effect of the present invention is not deteriorated.

Examples of liquid crystalline polyesters having preferred combinations of constituting components include liquid crystalline polyesters composed of p-hydroxybenzoic acid, 4,4'-dihydroxybiphenyl, hydroquinone, and terephthalic acid and/or isophthalic acid; liquid crystalline polyesters composed of p-hydroxybenzoic acid, hydroquinone, 4,4'-dihydroxybiphenyl, 2,6-naphthalenedicarboxylic acid, and terephthalic acid; and liquid crystalline polyesters composed of p-hydroxybenzoic acid, 2,6-dihydroxynaphthalene, 4,4'-dihydroxybiphenyl, and terephthalic acid and/or isophthalic acid.

[Chemical Formula 8]

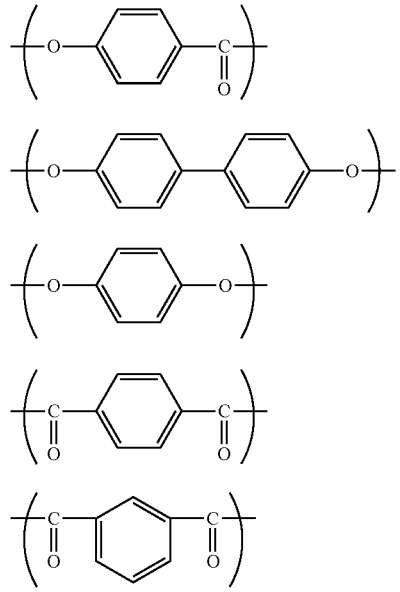

The structural unit (II) represents a structural unit produced from p-hydroxybenzoic acid; the structural unit (III) represents a structural unit produced from 4,4'-dihydroxybiphenyl; the structural unit (IV) represents a structural unit produced from hydroquinone; the structural unit (V) represents a structural unit produced from terephthalic acid; and the structural unit (VI) represents a structural unit produced from isophthalic acid.

The contents of the structural units (II), (III), (IV), (V), and (VI) are arbitrary, and the following contents are preferred for more effective exertion of the effect of the present invention. That is, in the liquid crystalline polyester obtained in the present invention, the amount of the structural unit (II) is preferably 65 to 80 mol %, more preferably 68 to 75 mol % with respect to the total of the structural units (II), (III), and (IV). The amount of the structural unit (III) is preferably 55 to 85 mol %, more preferably 55 to 75 mol %, still more preferably 60 to 70 mol % with respect to the total of the structural units (III) and (IV). The amount of the structural unit (V) is preferably 50 to 90 mol %, more preferably 60 to 88 mol %, still more preferably 65 to 85 mol % with respect to the total of the structural units (V) and (VI). In cases where the liquid crystalline polyester satisfies such a composition, generation of gas from the resulting liquid crystalline polyester can be suppressed, and the tensile strength and creep properties of the molded product can be improved.

In the present invention, the total of the structural units (III) and (IV) is preferably substantially equimolar to the total of the structural units (V) and (VI). The term "substantially equimolar" herein means that they are equimolar in terms of the units constituting the polymer backbone excluding the termini, but that they are not necessarily equimolar in terms of the units constituting the termini.

The composition of the liquid crystalline polyester produced in the present invention can be determined by measuring the $^1$H-nuclear magnetic resonance spectrum using a solution in which the liquid crystalline polyester is dissolved in a solvent in which the liquid crystalline polyester is soluble (for example, a mixed solvent of pentafluorophenol/deuterated tetrachloroethane).

The melting point (Tm) of the liquid crystalline polyester produced in the present invention is preferably 220 to 350° C. In cases where the melting point is not less than 220° C., heat resistance can be increased. The melting point is more preferably not less than 270° C., still more preferably not less than 300° C. On the other hand, in cases where the melting point is not more than 350° C., molding stability during the molding can be increased. The melting point is more preferably not more than 345° C., still more preferably not more than 340° C.

The melting point is measured using a differential scanning calorimeter DSC-7 (manufactured by PerkinElmer, Inc.). While the temperature of the liquid crystalline polyester is increased under the heating condition of 20° C./minute from room temperature, the endothermic peak temperature (Tm1) is observed. After maintaining the temperature of Tm1+20° C. for 5 minutes, the liquid crystalline polyester is once cooled to room temperature under the cooling condition of 20° C./minute. Thereafter, while the temperature is increased again under the heating condition of 20° C./minute, the endothermic peak temperature (Tm2) is observed to determine the melting point.

The melt viscosity of the liquid crystalline polyester produced by the present invention is preferably 1 to 200 Pa·s. In cases where the melt viscosity is not less than 1 Pa·s, generation of gas from the resulting liquid crystalline polyester can be suppressed, and the tensile strength and creep properties of the molded product can be improved. The melt viscosity is more preferably not less than 10 Pa·s, still more preferably not less than 20 Pa·s. On the other hand, in cases where the melt viscosity is not more than 200 Pa·s, fluidity can be increased. The melt viscosity is more preferably not more than 100 Pa·s, still more preferably not more than 50 Pa·s. The melt viscosity of the liquid crystalline polyester in the present invention is a value measured at the melting point of the liquid crystalline polyester+10° C. at a shear rate of 1000/s using a Koka-type flow tester.

In terms of the amount of gas generated from the liquid crystalline polyester having the structural unit (I) of the present invention, the rate of weight loss after heating as observed by keeping the liquid crystalline polyester under nitrogen atmosphere at a temperature of the melting point of the liquid crystalline polyester+20° C. for 30 minutes is not more than 0.1 wt %. The melting point of the liquid crystalline polyester+20° C. was noticed as a temperature at which the difference in the rate of weight loss after heating as observed by keeping the liquid crystalline polyester at high temperature for 30 minutes is clearly shown. In cases where the amount of gas generated from the liquid crystalline polyester exceeds 0.1 wt %, adhesion of the liquid crystalline polyester to the filler decreases, leading to large decreases in the tensile strength and creep properties of the molded product. The amount of gas generated is preferably not more than 0.07 wt %, more preferably not more than 0.05 wt %.

From the viewpoint of increasing the tensile strength and creep properties of the molded product, the liquid crystalline polyester preferably has the structural unit (IV). The liquid crystalline polyester more preferably has the structural units (II) to (VI).

[Chemical Formula 9]

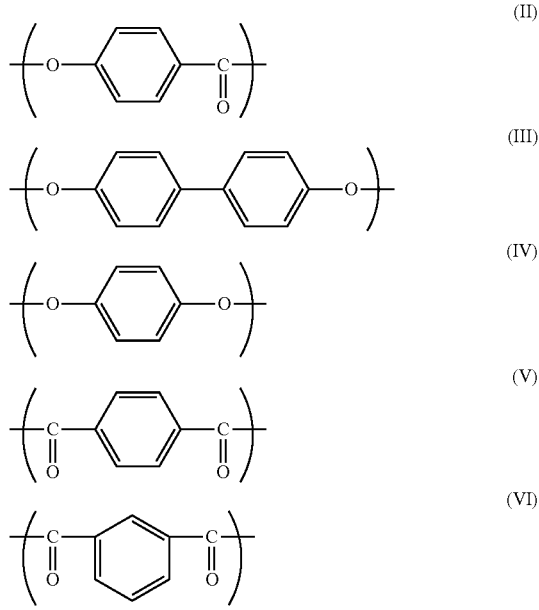

The liquid crystalline polyester of the present invention may be combined with one or more of other components to provide a liquid crystalline polyester resin composition. For example, the liquid crystalline polyester resin composition of the present invention may contain a filler for giving properties such as the mechanical strength of the liquid crystalline polyester. Examples of the filler include, but are not limited to, fillers in the shapes of fibers, plates, powders, and particles. Specific examples of the filler include:

those in the shapes of fibers and whiskers, such as glass fibers; carbon fibers including polyacrylonitrile (PAN)-based and pitch-based carbon fibers; metal fibers including stainless steel fibers, aluminum fibers, and brass fibers; organic fibers such as aromatic polyamide fibers; gypsum fibers; ceramic fibers; asbestos fibers; zirconia fibers; alumina fibers; silica fibers; titanium oxide fibers; silicon carbide fibers; rock wools; potassium titanate whiskers; barium titanate whiskers; aluminum borate whiskers; and silicon nitride whiskers; and those in the shapes of powders, particles, and plates, such as mica, talc, kaolin, silica, calcium carbonate, glass beads, glass flakes, glass microballoons, clays, molybdenum disulfide, wollastonite, titanium oxide, zinc oxide, calcium polyphosphate, and graphite.

Two or more of these may be contained. Among the above-described fillers, glass fibers and, in cases where electrical conductivity is required, PAN-based carbon fibers are preferably used. The type of the glass fiber is not limited as long as it is commonly used for reinforcement of resins, and examples of the type of the glass fiber include long-fiber-type and short-fiber-type chopped strands and milled fibers. The surface of the filler may be treated with a known coupling agent (for example, a silane coupling agent or a titanate coupling agent) or another surface treatment agent. The glass fiber may be coated or sized with a thermoplastic resin such as an ethylene/vinyl acetate copolymer or a thermosetting resin such as an epoxy resin. One or more of other thermoplastic resins may be contained within the range in which the object of the present invention is not deteriorated, in order to give predetermined properties.

In the liquid crystalline polyester resin composition of the present invention, the content of the filler is preferably 10 to 200 parts by weight with respect to 100 parts by weight of the liquid crystalline polyester. In cases where the content of the filler is not less than 10 parts by weight, the tensile strength and the tensile creep distortion of the molded product can be improved. The content is more preferably not less than 20 parts by weight, still more preferably not less than 30 parts by weight. On the other hand, in cases where the content of the filler is not more than 200 parts by weight, a liquid crystalline polyester resin composition having excellent moldability and fluidity can be obtained. The content of the filler is more preferably not more than 150 parts by weight, still more preferably not more than 100 parts by weight.

The liquid crystalline polyester resin composition of the present invention may also contain one or more of other components within the range in which the effect of the present invention is not deteriorated, and examples of such components include antioxidants and thermal stabilizers (for example, hindered-phenol-based agents, hydroquinone-based agents, and phosphite-based agents, and substituents thereof); weather proofing agents (for example, resorcinol-based, salicylate-based, benzotriazole-based, benzophenone-based, and hindered-amine-based agents), mold release agents and lubricants (for example, montanic acid, metal salts thereof, esters thereof, and half esters thereof, stearyl alcohol, stearamide, various bis-amides, bis-urea, and polyethylene waxes), pigments (for example, cadmium sulfide, phthalocyanine, and carbon black), dyes (for example, nigrosin), nucleating agents (for example, talc, silica, kaolin, and clay), plasticizers (for example, octyl p-oxybenzoate and N-butylbenzenesulfonamide), antistatic agents (for example, alkyl-sulfate-type anionic antistatic agents; quaternary-ammonium-salt-type cationic antistatic agents; nonionic antistatic agents such as polyoxyethylene sorbitan monostearate; and betaine-based amphoteric antistatic agents), and flame retardants (for example, red phosphorus; melamine cyanurate; hydroxides such as magnesium hydroxide and aluminum hydroxide; ammonium polyphosphate; brominated polystyrene; brominated polyphenylene ether (PPO); brominated polycarbonate (PC); brominated epoxy resins; and combinations of these bromine-based flame retardants and antimony trioxide).

The method for producing the liquid crystalline polyester resin composition of the present invention is not limited, and examples of the method include a method in which the liquid crystalline polyester is mixed with the components by dry blending or solution blending, a method in which the components are added upon polymerization of the liquid crystalline polyester, and a method in which the liquid crystalline polyester is melt-kneaded with the components. Among these, the method by melt kneading is preferred. The melt kneading may be carried out using a known method. Examples of the melt kneader include Banbury mixers, rubber rolls, kneaders, and single-screw or twin-screw extruders. Among these, twin-screw extruders are preferred. The melt-kneading temperature is preferably from the melting point of the liquid crystalline polyester to the melting point+50° C.

Examples of the kneading method include: 1) a method in which the liquid crystalline polyester, the filler, and other additives are fed at once from the main feeder (batch kneading method); 2) a method in which the liquid crystalline polyester and other additives are fed from the main feeder, and kneading is then carried out, followed by adding the filler and, if necessary, other additives from the side feeder and then carrying out kneading (side feeding method); and 3) a method in which a liquid crystalline polyester resin composition (master pellet) containing high concentrations of the liquid crystalline polyester and other additives is prepared, and the master pellet is kneaded with the liquid crystalline polyester and the filler such that predetermined concentrations are achieved (master pellet method). Examples of the method for adding the filler and other additives include the batch kneading method, sequential addition method, and method by addition of a high-concentration composition (master). Any of these method may be used.

The liquid crystalline polyester or the liquid crystalline polyester resin composition of the present invention can be processed into a molded product having excellent mechanical properties, by an ordinary molding method such as injection molding, extrusion molding, or press molding. Examples of the molded product herein include injection-molded products, extrusion-molded products, press-molded products, sheets, pipes, films, and fibers. Injection-molded products are preferred since the effect of the present invention can be remarkably obtained for such products.

Molded products obtained by molding the liquid crystalline polyester or the liquid crystalline polyester resin composition of the present invention can be used for, for example, electric/electronic parts represented by various gears, various cases, sensors, LED lamps, connectors, sockets, resistors, relay cases, relay bases, relay spools, switches, coil bobbins, condensers, variable-condenser cases, optical pickups, radiators, various terminal boards, transformers, plugs, printed circuit boards, tuners, speakers, microphones, headphones, compact motors, magnetic head bases, power modules, housings, semiconductors, liquid crystal display parts, FDD carriages, FDD chassis, HDD parts, motor brush holders, parabolic antennas, and computer-related parts; home and office electric appliance parts represented by VTR parts, television parts, irons, hair driers, rice cooker parts, microwave oven parts, acoustic components, audio equipment parts including audio/laser discs (registered trademark) and compact discs, illumination parts, refrigerator parts, air conditioner parts, typewriter parts, word processor parts, office computer-related parts, telephone-related parts, facsimile-related parts, and copier-related parts; machine-related parts represented by cleaning fixtures, various bearings including oilless bearings, stern bearings, and submerged bearings, motor parts, lighters, and typewriters; optical instruments and precision machine-related parts represented by microscopes, binoculars, cameras, and clocks; automotive/vehicle-related parts such as alternator terminals, alternator connectors, IC regulators, potentiometer bases for light dimmers, various valves such as exhaust gas valves, various fuel-related/exhaust-system/intake-system pipes, air intake nozzle snorkels, intake manifolds, fuel pumps, engine coolant joints, carburetor main bodies, carburetor spacers, exhaust gas sensors, coolant sensors, oil temperature sensors, throttle position sensors, crankshaft position sensors, air flow meters, brake pad wear sensors, thermostat bases for air conditioners, motor insulators for air conditioners, motor insulators for onboard equipments including power windows, heater air-flow control valves, brush holders for radiator motors, water pump impellers, turbine vanes, wiper motor-related parts, distributors, starter switches, starter relays, wire harnesses for transmission, window washer nozzles, air conditioner panel switch boards, coils for fuel-related electromagnetic valves, fuse connectors, horn terminals, insulating plates for electrical equipments, step motor rotors, lamp bezels, lamp sockets, lamp reflectors, lamp housings, brake pistons, solenoid bobbins, engine oil filters, and igniter cases; bottles for various agents such as shampoos, hair conditioners, liquid soaps, and detergents; tanks for storing liquid medicines/gases, such as tanks for storing liquid medicines, tanks for storing gases, coolant tanks, tanks for transferring oils, tanks for antiseptic solutions, tanks for blood transfusion pumps, fuel tanks, canisters, washer fluid reservoirs, and oil reservoir tanks; parts for use in medical devices; containers for storing foods such as seasonings including soy sauce, sauce, ketchup, mayonnaise, and dressing, fermented foods including miso and vinegar, oil and fat foods including salad oils, alcoholic beverages including sake, beer, sweet sake, whisky, shochu, and wine, soft drinks including carbonated beverages, juice, sports drinks, cow's milk, coffee beverages, oolong tea, black tea, and mineral water; and hollow containers such as tanks as parts for tools in daily life, bottle-shaped molded products, and their tanks. Since the liquid crystalline polyester and the liquid crystalline polyester resin composition of the present invention generate less gas, and have excellent tensile strength and creep properties, these are especially useful for electric/electronic parts such as relay cases and printed circuit boards, and for machine parts such as motor parts.

EXAMPLES

The present invention is described below by way of Examples. However, the present invention is not limited by the Examples. Evaluation of liquid crystalline polyesters and liquid crystalline polyester resin compositions was carried out by the following methods.

(1) Melting Point (Tm) of Liquid Crystalline Polyester

While the temperature of the liquid crystalline polyester was increased using a differential scanning calorimeter DSC-7 (manufactured by PerkinElmer, Inc.) under the heating condition of 20° C./minute from room temperature, the endothermic peak temperature (Tm1) was observed. After maintaining the temperature of Tm1+20° C. for 5 minutes, the liquid crystalline polyester was once cooled to room temperature under the cooling condition of 20° C./minute.

Thereafter, while the temperature was increased again under the heating condition of 20° C./minute, the endothermic peak temperature (Tm2) was observed to determine the melting point. In the following Production Examples, the melting point (Tm2) is described as Tm.

(2) Melt Viscosity of Liquid Crystalline Polyester

The melt viscosity of the liquid crystalline polyester was measured at Tm+10° C. at a shear rate of 1000/s using a Koka-type flow tester CFT-500D (orifice, 0.5 (diameter)×10 mm) (manufactured by Shimadzu Corporation).

(3) Composition of Liquid Crystalline Polyester

In an NMR sample tube, 50 mg of the liquid crystalline polyester was weight and placed, and dissolved in 800 μL of a pentafluorophenol/1,1,2,2-tetrachloroethane mixed solvent (mixing ratio, 65/35 w/w %), followed by carrying out $^1$H-NMR analysis using a UNITY INOVA 500 type NMR apparatus (manufactured by Varian, Inc.) at a monitoring frequency of 500 MHz at a temperature of 80° C. Based on the ratio of the peak area derived from the respective structural units observed at about 7 to 9.5 ppm, the composition of the liquid crystalline polyester was analyzed.

(4) Amount of Gas Generated from Liquid Crystalline Polyester

The pellet obtained from each of Examples and Comparative Examples was subjected to hot-air drying using a hot-air drier at 150° C. for 3 hours, and 20 mg of an arbitrary portion was excised. The portion was kept under nitrogen atmosphere at the temperature of the melting point of the liquid crystalline polyester+20° C. for 30 minutes using a thermogravimetric analysis apparatus (TGA), and the ratio of weight decrease was determined as the amount of gas generated.

(5) Tensile Strength of Liquid Crystalline Polyester and Liquid Crystalline Polyester Resin Composition The pellet obtained from each of Examples and Comparative Examples was subjected to hot-air drying using a hot-air drier at 150° C. for 3 hours, and then to injection molding using a FANUC α30C injection molding machine manufactured by FANUC Corporation, to form a dumbbell-shaped test piece having a size of 6.4 mm (width)×127 mm (length)×3.2 mm (thickness). In terms of the conditions for the injection molding, the resin temperature was set to the melting point of the liquid crystalline polyester+20° C.; the mold temperature was set to 90° C.; and the pressure was set to the lower limit of the filling pressure+1 MPa. This test piece was subjected to measurement of the tensile strength according to ASTM D638-08. The number n was 6, and the mean value of the 4 values obtained after exclusion of the maximum value and the minimum value from the measured values was regarded as the tensile strength.

(6) Creep Properties of Liquid Crystalline Polyester Resin Composition

The pellet obtained from each of Examples and Comparative Examples was subjected to hot-air drying using a hot-air drier at 150° C. for 3 hours, and then to injection molding using SG75H-MIV (manufactured by Sumitomo Heavy Industries, Ltd.) to provide a ASTM1 dumbbell test piece. For measurement of the tensile creep distortion, the test piece was subjected to a tensile creep test according to ASTM-D2990 under the conditions of: distance between fulcrums, 114 mm; atmosphere temperature, 120° C.; tensile stress, 20 MPa. The tensile creep distortion is a value determined by dividing the amount of displacement by the distance between fulcrums. The tensile creep distortion described in Examples is the value observed 150 hours after the beginning of the test. The number n was 6, and the mean value of the 4 values obtained after exclusion of the maximum value and the minimum value from the measured values was regarded as the tensile creep distortion. The smaller the value, the better the creep properties, so that the molded product can be said to be less likely to undergo thermal deformation.

(7) Acid Dissociation Constant (pKa) in Aqueous Sulfonic Acid Solution

The aqueous sulfonic acid solution used in each of Examples and Comparative Examples was subjected to titration at 25° C. using an aqueous sodium hydroxide solution, and the acid dissociation constant was calculated based on the pH value at the time point when 50% neutralization was achieved.

Example 1

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes.

Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-1). No trace of bumping was found inside the reaction vessel after the discharge.

The liquid crystalline polyester (a-1) had a Tm of 311° C. and a melt viscosity of 22 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.040 wt %.

Example 2

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.005 part by weight of ethanesulfonic acid (pKa: −1.3) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-2). No trace of bumping was found inside the reaction vessel after the discharge.

The liquid crystalline polyester (a-2) had a Tm of 311° C. and a melt viscosity of 21 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.041 wt %.

Example 3

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.005 part by weight of n-dodecylsulfonic acid (pKa: 0.3) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-3). No trace of bumping was found inside the reaction vessel after the discharge.

The liquid crystalline polyester (a-3) had a Tm of 314° C. and a melt viscosity of 23 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.071 wt %.

Example 4

To a 5-L reaction vessel equipped with a stirring blade and a distillation pipe, 829 parts by weight of p-hydroxybenzoic acid, 223 parts by weight of 4,4'-dihydroxybiphenyl, 88 parts by weight of hydroquinone, 266 parts by weight of terephthalic acid, 66 parts by weight of isophthalic acid, and 1072 parts by weight of acetic anhydride (1.05 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 350° C. for 3 hours. In this process, the temperature was controlled such that the length of time during which the temperature increased from 130° C. to 270° C. was 160 minutes. Thereafter, the polymerization temperature was kept at 350° C., and the pressure was reduced to 1.0 mmHg (133 Pa) for 1.0 hour. The reaction was further continued, and the polymerization was completed when the torque reached 15 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-4). No trace of bumping was found inside the reaction vessel after the discharge.

The liquid crystalline polyester (a-4) had a Tm of 334° C. and a melt viscosity of 28 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.049 wt %.

Example 5

To a 5-L reaction vessel equipped with a stirring blade and a distillation pipe, 764 parts by weight of p-hydroxybenzoic acid, 309 parts by weight of 4,4'-dihydroxybiphenyl, 118 parts by weight of t-butyl hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 4,4'-dihydroxybiphenyl, t-butyl hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-5). No trace of bumping was found inside the reaction vessel after the discharge.

The liquid crystalline polyester (a-5) had a Tm of 306° C. and a melt viscosity of 20 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.073 wt %.

Example 6

To a 5-L reaction vessel equipped with a stirring blade and a distillation pipe, 764 parts by weight of p-hydroxybenzoic acid, 397 parts by weight of 4,4'-dihydroxybiphenyl, 26 parts by weight of hydroquinone, 256 parts by weight of terephthalic acid, 138 parts by weight of isophthalic acid, and 1213 parts by weight of acetic anhydride (1.07 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-6). No trace of bumping was found inside the reaction vessel after the discharge.

The liquid crystalline polyester (a-6) had a Tm of 315° C. and a melt viscosity of 24 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.075 wt %.

Example 7

To a 5-L reaction vessel equipped with a stirring blade and a distillation pipe, 764 parts by weight of p-hydroxybenzoic acid, 221 parts by weight of 4,4'-dihydroxybiphenyl, 131 parts by weight of hydroquinone, 256 parts by weight of terephthalic acid, 138 parts by weight of isophthalic acid, and 1104 parts by weight of acetic anhydride (1.07 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-7). No trace of bumping was found inside the reaction vessel after the discharge.

The liquid crystalline polyester (a-7) had a Tm of 312° C. and a melt viscosity of 22 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.083 wt %.

Example 8

In a 5-L reaction vessel equipped with a stirring blade and a distillation pipe, 0.005 part by weight of methanesulfonic acid (pKa: −1.6) was fed with respect to a total of 100 parts by weight of benzoic acid, 4,4'-dihydroxybiphenyl, hydroquinone, terephthalic acid, and isophthalic acid, to 576 parts by weight of p-hydroxybenzoic acid, 311 parts by weight of 4,4'-dihydroxybiphenyl, 122 parts by weight of hydroquinone, 439 parts by weight of terephthalic acid, 23 parts by weight of isophthalic acid, and 1085 parts by weight of acetic anhydride, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-8). No trace of bumping was found inside the reaction vessel after the discharge.

The liquid crystalline polyester (a-8) had a Tm of 326° C. and a melt viscosity of 25 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.087 wt %.

Example 9

To a 5-L reaction vessel equipped with a stirring blade and a distillation pipe, 1037 parts by weight of p-hydroxybenzoic acid, 148 parts by weight of 4,4'-dihydroxybiphenyl, 58 parts by weight of hydroquinone, 98 parts by weight of terephthalic acid, 120 parts by weight of isophthalic acid, and 1091 parts by weight of acetic anhydride (1.07 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 340° C. for 3 hours. In this process, the temperature was controlled such that the length of time during which the temperature increased from 130° C. to 270° C. was 163 minutes. Thereafter, the polymerization temperature was kept at 340° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-9). No trace of bumping was found inside the reaction vessel after the discharge.

The liquid crystalline polyester (a-9) had a Tm of 324° C. and a melt viscosity of 26 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.076 wt %.

Example 10

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.11 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-10). No trace of bumping was found inside the reaction vessel after the discharge.

The liquid crystalline polyester (a-10) had a Tm of 314° C. and a melt viscosity of 22 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.084 wt %.

Example 11

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.0001 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-11). No trace of bumping was found inside the reaction vessel after the discharge.

The liquid crystalline polyester (a-11) had a Tm of 310° C. and a melt viscosity of 20 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.081 wt %.

Example 12

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. The resulting mixture was heated with stirring under nitrogen atmosphere, and, when the temperature reached 130° C., 0.005 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid. The mixture was then heated to 145° C., and the reaction was allowed to proceed for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-12). No trace of bumping was found inside the reaction vessel after the discharge.

The liquid crystalline polyester (a-12) had a Tm of 311° C. and a melt viscosity of 21 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.042 wt %.

Example 13

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. The resulting mixture was heated with stirring under nitrogen atmosphere, and the reaction was allowed to proceed at 145° C. for 2 hours to complete acetylation. The resulting product was heated to 330° C. for 3 hours. In this process, when the temperature reached 150° C., 0.005 part by weight of methanesulfonic acid (pKa: −1.6) was fed with respect to a total of 100 parts by weight of p-hydroxybenzoic acid, 4,4'-dihydroxybiphenyl, hydroquinone, terephthalic acid, and isophthalic acid. In this process, the temperature was controlled such that the length of time during which the temperature increased from 130° C. to 270° C. was 230 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-13). No trace of bumping was found inside the reaction vessel after the discharge.

The liquid crystalline polyester (a-13) had a Tm of 313° C. and a melt viscosity of 23 Pa·s. Results of analysis of the composition by the method described above are shown in Table 1. The total of the structural unit (III) and the structural unit (1V) was substantially equimolar to the total of the structural unit (V) and the structural unit (VI). The amount of gas generated was 0.095 wt %.

Example 14

To a 5-L reaction vessel equipped with a stirring blade and a distillation pipe, 825 parts by weight of p-hydroxybenzoic acid, 371 parts by weight of 4,4'-dihydroxybiphenyl, 248 parts by weight of terephthalic acid, 83 parts by weight of isophthalic acid, and 1213 parts by weight of acetic anhydride (1.10 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 4,4'-dihydroxybiphenyl, terephthalic acid, and isophthalic acid, and the resulting mixture was heated with stirring under nitrogen atmosphere, followed by allowing the reaction to proceed at 145° C. for 1 hour to complete acetylation. The resulting product was heated to 350° C. for 3 hours. In this process, the temperature was controlled such that the length of time during which the temperature increased from 130° C. to 270° C. was 160 minutes. Thereafter, the polymerization temperature was kept at 350° C., and the pressure was reduced to 1.0 mmHg (133 Pa) for 1.0 hour. The reaction was further continued, and the polymerization was completed when the torque reached 15 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-14). No trace of bumping was found inside the reaction vessel after the discharge.

The liquid crystalline polyester (a-14) had a Tm of 327° C. and a melt viscosity of 26 Pa·s. Results of analysis of the composition by the method described above are shown in Table 1. The structural unit (III) was substantially equimolar to the total of the structural unit (V) and the structural unit (VI). The amount of gas generated was 0.082 wt %.

Example 15

To a 5-L reaction vessel equipped with a stirring blade and a distillation pipe, 66 parts by weight of p-hydroxybenzoic acid, 804 parts by weight of 6-hydroxy-2-naphthoic acid, 442 parts by weight of 4,4'-dihydroxybiphenyl, 396 parts by weight of terephthalic acid, and 1067 parts by weight of acetic anhydride (1.1 equivalents with respect to the total phenolic hydroxyl groups) were fed. At the same time, 0.005 part by weight of methanesulfonic acid (pKa: −1.6) was fed with respect to a total of 100 parts by weight of p-hydroxybenzoic acid, 6-hydroxy-2-naphthoic acid, 4,4'-dihydroxybiphenyl, and terephthalic acid, and the resulting mixture was heated with stirring under nitrogen atmosphere, followed by allowing the reaction to proceed at 145° C. for 1 hour to complete acetylation. The resulting product was heated to 360° C. for 3 hours. In this process, the temperature was controlled such that the length of time during which the temperature increased from 130° C. to 270° C. was 165 minutes. Thereafter, the polymerization temperature was kept at 360° C., and the pressure was reduced to 1.0 mmHg (133 Pa) for 1.0 hour. The reaction was further continued, and the polymerization was completed when the torque reached 15 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-15). No trace of bumping was found inside the reaction vessel after the discharge.

The liquid crystalline polyester (a-15) had a Tm of 340° C. and a melt viscosity of 28 Pa·s. Results of analysis of the composition by the method described above are shown in Table 1. The structural unit (III) was substantially equimolar to the total of the structural unit (V). The amount of gas generated was 0.095 wt %.

Comparative Example 1

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. The resulting mixture was heated with stirring under nitrogen atmosphere, followed by allowing the reaction to proceed at 145° C. for 2 hours to complete acetylation. The resulting product was heated to 330° C. for 4 hours. In this process, the temperature was controlled such that the length of time during which the temperature increased from 130° C. to 270° C. was 265 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-16). No trace of bumping was found inside the reaction vessel after the discharge.

The liquid crystalline polyester (a-16) had a Tm of 310° C. and a melt viscosity of 20 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.123 wt %.

Comparative Example 2

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. The resulting mixture was heated with stirring under nitrogen atmosphere, followed by allowing the reaction to proceed at 145° C. for 2 hours to complete acetylation. The resulting product was heated to 330° C. for 3 hours. In this process, the temperature was controlled such that the length of time during which the temperature increased from 130° C. to 270° C. was 225 minutes. Thereafter, the polymerization temperature was kept at 330° C., and the pressure was reduced to 1.0 mmHg (133 Pa) for 1.0 hour. The reaction was further continued, but the polymerization was impossible since the torque repeatedly decreased and did not reach the target torque value. This was caused by the following reason: since the aliphatic sulfonic acid specified in the present invention was not added, the deacylated polycondensation reaction could not follow the sharp temperature increase, and monomers therefore remained unreacted, causing sublimation of the unreacted monomers and bumping, resulting in imbalance of the terminal groups. Spots that seemed to be traces of bumping were found inside the reaction vessel after the discharge in the middle of the polymerization.

Comparative Example 3

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.005 part by weight of N-methylimidazole was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-17). Spots that seemed to be traces of bumping were found inside the reaction vessel after the discharge.

The liquid crystalline polyester (a-17) had a Tm of 314° C. and a melt viscosity of 24 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.140 wt %.

Comparative Example 4

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.005 part by weight of p-toluenesulfonic acid (pKa: −2.1) was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-18). Spots that seemed to be traces of bumping were found inside the reaction vessel after the discharge.

The liquid crystalline polyester (a-18) had a Tm of 313° C. and a melt viscosity of 23 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.126 wt %.

Comparative Example 5

To a 5-L reaction vessel equipped with a stirring blade and a distillation pipe, 764 parts by weight of p-hydroxybenzoic acid, 309 parts by weight of 4,4'-dihydroxybiphenyl, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. At the same time, 0.005 part by weight of sodium acetate was fed with respect to a total of 100 parts by weight of p-hydroxybenzoic acid, 4,4'-dihydroxybiphenyl, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-19). Spots that seemed to be traces of bumping were found inside the reaction vessel after the discharge.

The liquid crystalline polyester (a-19) had a Tm of 310° C. and a melt viscosity of 21 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.177 wt %.

Comparative Example 6

To a 5-L reaction vessel equipped with a stirring blade and a distillation pipe, 1271 parts by weight of p-hydroxybenzoic acid, 214 parts by weight of 4,4'-dihydroxybiphenyl, 191 parts by weight of terephthalic acid, 221 parts by weight of polyethylene terephthalate having an intrinsic viscosity of about 0.6 dl/g, and 1280 parts by weight of acetic anhydride (1.09 equivalents with respect to the total phenolic hydroxyl groups) were fed. In this case, the ratio of 4,4'-dihydroxybiphenyl to 100 mol % of the total diol was 50 mol %. At the same time, 0.005 part by weight of methanesulfonic acid (pKa: −1.6) was fed with respect to a total of 100 parts by weight of p-hydroxybenzoic acid, 4,4'-dihydroxybiphenyl, terephthalic acid, and polyethylene terephthalate, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 15 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-20). In the pellets obtained, objects that seemed to be unmelted polyethylene terephthalate were found. No trace of bumping was found inside the reaction vessel after the discharge.

The liquid crystalline polyester (a-20) had a Tm of 325° C. and a melt viscosity of 13 Pa·s. Results of analysis of the composition by the method described above are shown in Table 1. The aromatic diol component derived from 4,4'-dihydroxybiphenyl was contained in an amount of 50 mol % with respect to 100 mol % of the total diol component. The total of the structural unit (III) and the ethylene glycol-derived structural unit was substantially equimolar to the structural unit (V). The amount of gas generated was 0.171 wt %.

Comparative Example 7

To a 5-L reaction vessel equipped with a stirring blade and a distillation pipe, 764 parts by weight of p-hydroxybenzoic acid, 362 parts by weight of 4,4'-dihydroxydiphenyl sulfide, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. In this case, the ratio of hydroquinone to 100 mol % of the total diol was 30 mol %. At the same time, 0.005 part by weight of methanesulfonic acid (pKa: −1.6) was fed with respect to a total of 100 parts by weight of p-hydroxybenzoic acid, 4,4'-dihydroxydiphenyl sulfide, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-21). Spots that seemed to be traces of bumping were found inside the reaction vessel after the discharge.

The liquid crystalline polyester (a-21) had a Tm of 306° C. and a melt viscosity of 20 Pa·s. Results of analysis of the composition by the method described above are shown in Table 1. The aromatic diol component derived from hydroquinone was contained in an amount of 30 mol % with respect to 100 mol % of the total diol component. The amount of gas generated was 0.153 wt %.

Comparative Example 8

To a 5-L reaction vessel equipped with a stirring blade and a distillation pipe, 764 parts by weight of p-hydroxybenzoic acid, 319 parts by weight of 1,4-cyclopentylphosphonyl-1,4-benzenediol, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. In this case, the ratio of hydroquinone to 100 mol % of the total diol was 30 mol %. At the same time, 0.005 part by weight of methanesulfonic acid (pKa: −1.6) was fed with respect to a total of 100 parts by weight of p-hydroxybenzoic acid, 1,4-cyclopentylphosphonyl-1,4-benzenediol, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-22). Spots that seemed to be traces of bumping were found inside the reaction vessel after the discharge.

The liquid crystalline polyester (a-22) had a Tm of 302° C. and a melt viscosity of 19 Pa·s. Results of analysis of the composition by the method described above are shown in Table 1. The aromatic diol component derived from hydroquinone was contained in an amount of 30 mol % with respect to 100 mol % of the total diol component. The amount of gas generated was 0.160 wt %.

Comparative Example 9

To a 5-L reaction vessel equipped with a stirring blade and a distillation pipe, 764 parts by weight of p-hydroxybenzoic acid, 256 parts by weight of 2,2'-(2,5-dihydroxy-1,3-phenylene)diacetonitrile, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. In this case, the ratio of hydroquinone to 100 mol % of the total diol was 30 mol %. At the same time, 0.005 part by weight of methanesulfonic acid (pKa: −1.6) was fed with respect to a total of 100 parts by weight of p-hydroxybenzoic acid, 2,2'-(2,5-dihydroxy-1,3-phenylene)diacetonitrile, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-23). Spots that seemed to be traces of bumping were found inside the reaction vessel after the discharge.

The liquid crystalline polyester (a-23) had a Tm of 302° C. and a melt viscosity of 19 Pa·s. Results of analysis of the composition by the method described above are shown in Table 1. The aromatic diol component derived from hydroquinone was contained in an amount of 30 mol % with respect to 100 mol % of the total diol component. The amount of gas generated was 0.152 wt %.

Comparative Example 10

To a 5-L reaction vessel equipped with a stirring blade and a distillation pipe, 764 parts by weight of p-hydroxybenzoic acid, 462 parts by weight of 6,7-diphenylnaphthalene-1,4-diol, 78 parts by weight of hydroquinone, 256 parts by weight of terephthalic acid, 138 parts by weight of isophthalic acid, and 1158 parts by weight of acetic anhydride (1.07 equivalents with respect to the total phenolic hydroxyl groups) were fed. In this case, the ratio of hydroquinone to 100 mol % of the total diol was 30 mol %. At the same time, 0.005 part by weight of methanesulfonic acid (pKa: −1.6) was fed with respect to a total of 100 parts by weight of p-hydroxybenzoic acid, 6,7-diphenylnaphthalene-1,4-diol, hydroquinone, terephthalic acid, and isophthalic acid, and the resulting mixture was heated with stirring under nitrogen atmosphere, followed by allowing the reaction to proceed at 145° C. for 1 hour to complete acetylation. The resulting product was heated to 330° C. for 3 hours. In this process, the temperature was controlled such that the length of time during which the temperature increased from 130° C. to 270° C. was 165 minutes. Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm² (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-24). Spots that seemed to be traces of bumping were found inside the reaction vessel after the discharge.

The liquid crystalline polyester (a-24) had a Tm of 305° C. and a melt viscosity of 20 Pa·s. Results of analysis of the composition by the method described above are shown in Table 1. The aromatic diol component derived from hydroquinone was contained in an amount of 30 mol % with respect to 100 mol % of the total diol component. The amount of gas generated was 0.141 wt %.

Comparative Example 11

To a 5-L reaction vessel equipped with a stirring blade and a distillation pipe, 997 parts by weight of p-hydroxybenzoic acid acetate, 449 parts by weight of 4,4'-dihydroxybiphenyl diacetate, 138 parts by weight of hydroquinone diacetate, 256 parts by weight of terephthalic acid, 138 parts by weight of isophthalic acid, and 76 parts by weight of acetic anhydride (0.07 equivalent with respect to the total acetyl groups) were fed. At the same time, 0.005 part by weight of methanesulfonic acid (pKa: −1.6) was fed with respect to a total of 100 parts by weight of p-hydroxybenzoic acid acetate, 4,4'-dihydroxybiphenyl diacetate, hydroquinone diacetate, terephthalic acid, and isophthalic acid, and the resulting mixture was heated to 330° C. for 3 hours with stirring under nitrogen atmosphere. In this process, the temperature was controlled such that the length of time during which the temperature increased from 130° C. to 270° C. was 165 minutes.

Thereafter, the polymerization temperature was kept at 330° C., and the pressure was reduced to 1.0 mmHg (133 Pa) for 1.0 hour. The reaction was further continued, and the polymerization was completed when the torque reached 20 kg·cm. Subsequently, the inside of the reaction vessel was pressurized to 1.0 kg/cm$^2$ (0.1 MPa), and the polymer was discharged as a strand-shaped product through a mouthpiece having a single circular discharge outlet with a diameter of 10 mm. The product was then pelletized using a cutter to obtain pellets of a liquid crystalline polyester (a-25). No trace of bumping was found inside the reaction vessel after the discharge.

The liquid crystalline polyester (a-25) had a Tm of 312° C. and a melt viscosity of 24 Pa·s. Results of analysis of the composition by the method described above are shown in Table 1. The total of the structural unit (III) and the structural unit (IV) was substantially equimolar to the total of the structural unit (V) and the structural unit (VI). The amount of gas generated was 0.120 wt %.

Results of evaluation in Examples 1 to 15 and Comparative Examples 1 to 11 are shown in Table 1. The pellets obtained in the Examples and Comparative Examples were also subjected to evaluation of the tensile strength.

By the addition of an aliphatic sulfonic acid, bumping in the polymerization vessel could be prevented even in the cases where the length of time during which the temperature increased from 130° C. to 270° C. was short, and liquid crystalline polyesters that generate less gas and have excellent tensile strength could be obtained.

TABLE 1

| | Liquid crystalline polyester | Diol used *1 | Composition [(II)/(II) + (III) + (IV)] (mol %) | [(III)/(III) + (IV)] (mol %) | [(V)/(V) + (VI)] (mol %) | Catalyst species | Timing of addition | Amount added (parts by weight) *7 | Length of time of temperature increase from 130° C. to 270° C. (minutes) | Trace of bumping in polymerization vessel | Amount of gas generated (after keeping at melting point + 20° C. for 30 minutes (wt %) | Tensile strength (MPa) |
|---|---|---|---|---|---|---|---|---|---|---|---|---|
| Example 1 | a-1 | HQ, DHB | 70 | 70 | 65 | Methanesulfonic acid | Together with materials | 0.005 | 165 | No | 0.040 | 170 |
| Example 2 | a-2 | HQ, DHB | 70 | 70 | 65 | Ethanesulfonic acid | Together with materials | 0.005 | 165 | No | 0.041 | 168 |
| Example 3 | a-3 | HQ, DHB | 70 | 70 | 65 | n-Dodecylsulfonic acid | Together with materials | 0.005 | 165 | No | 0.071 | 163 |
| Example 4 | a-4 | HQ, DHB | 75 | 60 | 80 | Methanesulfonic acid | Together with materials | 0.005 | 160 | No | 0.049 | 173 |
| Example 5 | a-5 | t-Butylhydroquinone, DHB | 77 | 100 | 65 | Methanesulfonic acid | Together with materials | 0.005 | 165 | No | 0.073 | 159 |
| Example 6 | a-6 | HQ, DHB | 70 | 90 | 65 | Methanesulfonic acid | Together with materials | 0.005 | 165 | No | 0.075 | 152 |
| Example 7 | a-7 | HQ, DHB | 70 | 50 | 65 | Methanesulfonic acid | Together with materials | 0.005 | 165 | No | 0.083 | 150 |
| Example 8 | a-8 | HQ, DHB | 60 | 70 | 95 | Methanesulfonic acid | Together with materials | 0.005 | 165 | No | 0.087 | 148 |
| Example 9 | a-9 | HQ, DHB | 85 | 70 | 45 | Methanesulfonic acid | Together with materials | 0.005 | 163 | No | 0.076 | 156 |
| Example 10 | a-10 | HQ, DHB | 70 | 70 | 65 | Methanesulfonic acid | Together with materials | 0.11 | 165 | No | 0.084 | 162 |
| Example 11 | a-11 | HQ, DHB | 70 | 70 | 65 | Methanesulfonic acid | Together with materials | 0.0001 | 165 | No | 0.081 | 163 |
| Example 12 | a-12 | HQ, DHB | 70 | 70 | 65 | Methanesulfonic acid | 130° C.*6 | 0.005 | 165 | No | 0.042 | 169 |
| Example 13 | a-13 | HQ, DHB | 70 | 70 | 65 | Methanesulfonic acid | 150° C.*6 | 0.005 | 230 | No | 0.095 | 163 |
| Example 14 | a-14 | DHB | 75 | 100 | 75 | Methanesulfonic acid | Together with materials | 0.005 | 160 | No | 0.082 | 152 |
| Example 15 | a-15 | DHB | 17 | 100 | 100 | Methanesulfonic acid | Together with materials | 0.005 | 165 | No | 0.095 | 155 |
| Comparative Example 1 | a-16 | HQ, DHB | 70 | 70 | 65 | — | — | — | 265 | No | 0.123 | 164 |
| Comparative Example 2 | Not polymerizable | HQ, DHB | — | — | — | — | — | — | 225 | Yes | — | — |
| Comparative Example 3 | a-17 | HQ, DHB | 70 | 70 | 65 | N-methylimidazole | Together with materials | 0.005 | 165 | Yes | 0.140 | 162 |
| Comparative Example 4 | a-18 | HQ, DHB | 70 | 70 | 65 | p-Toluenesulfonic acid | Together with materials | 0.005 | 165 | Yes | 0.126 | 159 |
| Comparative Example 5 | a-19 | HQ, DHB | 70 | 70 | 65 | Sodium acetate | Together with materials | 0.005 | 165 | Yes | 0.177 | 158 |
| Comparative Example 6 | a-20 | DHB, ethylene glycol | 89 | 100 | 100 | Methanesulfonic acid | Together with materials | 0.005 | 165 | No | 0.171 | 107 |
| Comparative Example 7 | a-21 | *2 | 77 | 0 | 65 | Methanesulfonic acid | Together with materials | 0.005 | 165 | Yes | 0.153 | 111 |
| Comparative Example 8 | a-22 | *3 | 77 | 0 | 65 | Methanesulfonic acid | Together with materials | 0.005 | 165 | Yes | 0.160 | 109 |

TABLE 1-continued

| | Liquid crystalline polyester | Diol used *1 | Composition [(I)/(II) + (III) + (IV)] (mol %) | (III)/[(III) + (IV)] (mol %) | (V)/[(V) + (VI)] (mol %) | Catalyst species | Catalyst Timing of addition | Amount added (parts by weight) *7 | Length of time of temperature increase from 130° C. to 270° C. (minutes) | Trace of bumping in polymerization vessel | Amount of gas generated (after keeping at melting point + 20° C. for 30 minutes (wt %) | Tensile strength (MPa) |
|---|---|---|---|---|---|---|---|---|---|---|---|---|
| Comparative Example 9 | a-23 | *4 | 77 | 0 | 65 | Methanesulfonic acid | Together with materials | 0.005 | 165 | Yes | 0.152 | 114 |
| Comparative Example 10 | a-24 | *5 | 77 | 0 | 65 | Methanesulfonic acid | Together with materials | 0.005 | 165 | Yes | 0.141 | 116 |
| Comparative Example 11 | a-25 | Diacetylated products of HQ, DHB | 70 | 70 | 65 | Methanesulfonic acid | Together with materials | 0.005 | 165 | No | 0.120 | 160 |

*1 HQ represents hydroquinone, and DHB represents 4,4'-dihydroxybiphenyl.
*2 HQ, 4,4'-dihydroxydiphenyl sulfide
*3 HQ, 1,4-cyclopentylphosphonyl-1,4-benzenediol
*4 HQ, 2,2'-(2,5-dihydroxy-1,3-phenylene)diacetonitrile
*5 HQ, 6,7-diphenylnaphthalene-1,4-diol
*6 Liquid temperature in the reaction vessel
*7 In Comparative Example 11, the value is represented by parts by weight with respect to a total of 100 parts by weight of carboxylic acid acetate, diacetate, and dicarboxylic acid.

To the liquid crystalline polyesters obtained in Examples 1 to 15 and Comparative Examples 1 to 11, fillers are further added to prepare liquid crystalline polyester resin compositions. The filler used for each of the Examples and the Comparative Examples was as follows.

Filler (B)

(b-1) Glass chopped strand (ECS03T747H), manufactured by Nippon Electric Glass Co., Ltd.

(b-2) Milled fiber (40M-10A), manufactured by Nippon Electric Glass Co., Ltd.

(b-3) Mica (A-21), manufactured by YAMAGUCHI MICA CO., LTD.

(b-4) Talc (PKP-80), manufactured by FUJI TALC INDUSTRIAL CO., LTD.

Examples 16 to 34, Comparative Examples 12 to 25

In a type TEM35B twin-screw extruder manufactured by TOSHIBA MACHINE CO., LTD. (co-rotating intermeshing type), a side feeder was installed at the C3 portion, and a vacuum vent was installed at the C5 portion, along the series of cylinders C1 (main feeder-side heater) to C6 (die-side heater). Using a screw arrangement in which kneading blocks were incorporated in the C2 portion and the C4 portion, each liquid crystalline polyester (a-1 to a-25) at the content shown in Table 2 or 3 was fed from the hopper, and, if necessary, a filler (b-1 to b-4) was fed from the side feeder at the content shown in Table 2 or 3 with respect to 100 parts by weight of the liquid crystalline polyester. The cylinder temperature was set to the melting temperature of the liquid crystalline polyester+20° C., and melt kneading was carried out. The liquid crystalline polyester resin composition discharged in a strand-like shape from the die was cooled in a water cooling bath, and pelletized using a strand cutter, to obtain pellets of a liquid crystalline polyester resin composition. The resulting pellets were evaluated for the tensile strength and creep properties by the methods described in (5) and (6).

Results of evaluation of Examples 16 to 34 and Comparative Examples 12 to 25 are shown in Tables 2 and 3.

TABLE 2

| | Liquid crystalline polyester (parts by weight) | Filler (parts by weight) | Tensile strength before kneading with filler (i) (MPa) | Tensile strength after kneading with filler (ii) (MPa) | Ratio between tensile strengths observed before and after kneading with filler (ii)/(i) | Tensile creep strain after kneading with filler (iii) (%) |
|---|---|---|---|---|---|---|
| Example 16 | a-1 (100) | b-1 (55) | 170 | 199 | 1.17 | 1.31 |
| Example 17 | a-2 (100) | b-1 (55) | 168 | 197 | 1.17 | 1.31 |
| Example 18 | a-3 (100) | b-1 (55) | 163 | 185 | 1.13 | 1.51 |
| Example 19 | a-4 (100) | b-1 (55) | 173 | 202 | 1.17 | 1.24 |
| Example 20 | a-5 (100) | b-1 (55) | 159 | 180 | 1.13 | 1.63 |
| Example 21 | a-6 (100) | b-1 (55) | 152 | 176 | 1.16 | 1.53 |
| Example 22 | a-7 (100) | b-1 (55) | 150 | 173 | 1.15 | 1.57 |
| Example 23 | a-8 (100) | b-1 (55) | 148 | 170 | 1.15 | 1.75 |
| Example 24 | a-9 (100) | b-1 (55) | 156 | 178 | 1.14 | 1.55 |
| Example 25 | a-10 (100) | b-1 (55) | 162 | 187 | 1.15 | 1.54 |
| Example 26 | a-11 (100) | b-1 (55) | 163 | 188 | 1.15 | 1.57 |
| Example 27 | a-12 (100) | b-1 (55) | 169 | 198 | 1.17 | 1.30 |
| Example 28 | a-13 (100) | b-1 (55) | 163 | 188 | 1.15 | 1.64 |
| Example 29 | a-14 (100) | b-1 (55) | 152 | 174 | 1.14 | 1.64 |
| Example 30 | a-15 (100) | b-1 (55) | 155 | 175 | 1.13 | 1.71 |
| Example 31 | a-1 (100) | b-2 (55) | 170 | 180 | 1.06 | 1.50 |
| Example 32 | a-1 (100) | b-3 (66) | 170 | 158 | 0.93 | 1.63 |
| Example 33 | a-1 (100) | b-4 (20) | 170 | 160 | 0.94 | 1.62 |
| Example 34 | a-1 (100) | b-2 (35) b-4 (20) | 170 | 171 | 1.01 | 1.54 |

TABLE 3

| | Liquid crystalline polyester (parts by weight) | Filler (parts by weight) | Tensile strength before kneading with filler (i) (MPa) | Tensile strength after kneading with filler (ii) (MPa) | Ratio between tensile strengths observed before and after kneading with filler (ii)/(i) | Tensile creep strain after kneading with filler (iii) (%) |
|---|---|---|---|---|---|---|
| Comparative Example 12 | a-16 (100) | b-1 (55) | 164 | 170 | 1.04 | 1.79 |
| Comparative Example 13 | a-17 (100) | b-1 (55) | 162 | 167 | 1.03 | 1.83 |
| Comparative Example 14 | a-18 (100) | b-1 (55) | 159 | 164 | 1.03 | 2.10 |
| Comparative Example 15 | a-19 (100) | b-1 (55) | 158 | 164 | 1.04 | 2.16 |
| Comparative Example 16 | a-20 (100) | b-1 (55) | 107 | 110 | 1.03 | 2.93 |
| Comparative Example 17 | a-21 (100) | b-1 (55) | 111 | 113 | 1.02 | 2.82 |
| Comparative Example 18 | a-22 (100) | b-1 (55) | 109 | 111 | 1.02 | 2.76 |
| Comparative Example 19 | a-23 (100) | b-1 (55) | 114 | 116 | 1.02 | 2.96 |
| Comparative Example 20 | a-24 (100) | b-1 (55) | 116 | 117 | 1.01 | 2.90 |
| Comparative Example 21 | a-25 (100) | b-1 (55) | 160 | 167 | 1.04 | 1.80 |
| Comparative Example 22 | a-16 (100) | b-2 (55) | 164 | 159 | 0.97 | 2.09 |
| Comparative Example 23 | a-16 (100) | b-3 (66) | 164 | 128 | 0.78 | 2.32 |
| Comparative Example 24 | a-16 (100) | b-4 (20) | 164 | 130 | 0.79 | 2.29 |
| Comparative Example 25 | a-16 (100) | b-2 (35) b-4 (20) | 164 | 145 | 0.88 | 1.98 |

The ratio between the tensile strengths observed before and after the kneading with the filler was higher in Examples 16 to 34 than in Comparative Examples 12 to 25. Thus, it can be seen that the effect of the fillers to enhance the tensile strength is excellent in Examples 16 to 34. It can also be seen that the Examples have excellent creep properties after the kneading with the fillers.

The invention claimed is:

1. A method for producing a liquid crystalline polyester, said method comprising reacting an aromatic hydroxycarboxylic acid(s), a diol(s) containing an aromatic diol having the following structural unit (I) in an amount of not less than 70 mol % with respect to 100 mol % of entire diol used for producing liquid crystalline polyester, and an aromatic dicarboxylic acid(s), with an acylating agent in the presence of an aliphatic sulfonic acid(s) represented by the Formula (A) below:

 (I)

wherein Ar has a molecular weight of less than 200 and is a divalent aromatic hydrocarbon group, R—SO$_3$H (R: C$_1$-C$_{12}$ alkyl group).   Formula (A)

2. The method for producing a liquid crystalline polyester according to claim 1, wherein said aliphatic sulfonic acid(s) is/are added before beginning of deacylated polycondensation reaction.

3. The method for producing a liquid crystalline polyester according to claim 1, wherein said aliphatic sulfonic acid(s) is/are added when the liquid temperature in the reaction vessel is not more than 130° C.

4. The method for producing a liquid crystalline polyester according to claim 1, wherein 0.0005 part by weight to 0.1 part by weight of said aliphatic sulfonic acid(s) is/are added to a total of 100 parts by weight of said aromatic hydroxycarboxylic acid(s), diol(s), and aromatic dicarboxylic acid(s).

5. The method for producing a liquid crystalline polyester according to claim 1, wherein said aromatic diol is a compound having the following structural unit (IV):

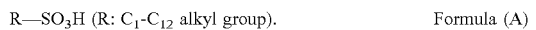 (IV)

6. The method for producing a liquid crystalline polyester according to claim 1, wherein said aromatic hydroxycarboxylic acid is a compound having the following structural unit (II);

said aromatic diol is a compound having the following structural unit (III), and a compound having the following structural unit (IV); and said aromatic dicarboxylic acid is a compound having the following structural unit (V), and a compound having the following structural unit (VI):

 (II)

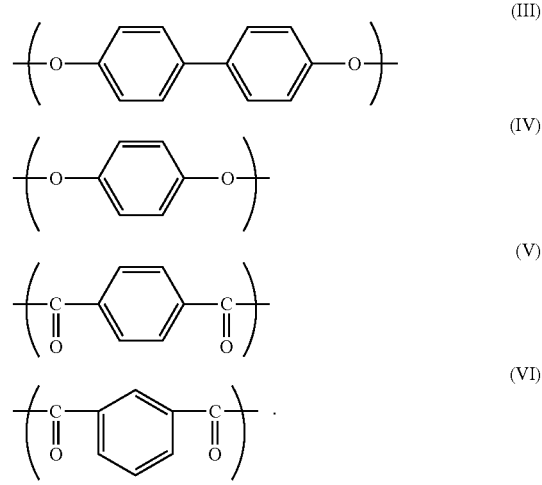

7. The method for producing a liquid crystalline polyester according to claim 1, wherein said obtained liquid crystalline polyester is a liquid crystalline polyester in which said structural unit (II) is contained in an amount of 65 to 80 mol % with respect to the total of said structural units (II), (III), and (IV);

said structural unit (III) is contained in an amount of 55 to 85 mol % with respect to the total of said structural units (III) and (IV);

said structural unit (V) is contained in an amount of 50 to 90 mol % with respect to the total of said structural units (V) and (VI); and the total of said structural units (III) and (IV) is substantially equimolar to the total of said structural units (V) and (VI).

8. The method for producing a liquid crystalline polyester according to claim 1, wherein said aliphatic sulfonic acid is methanesulfonic acid and/or ethanesulfonic acid.

9. A liquid crystalline polyester comprising a structural unit derived from an aromatic diol represented by the following structural unit (I):

 (I), in an amount of not less than 70 mol % with respect to 100 mol % of structural units derived from the entire diol used for producing the liquid crystalline polyester, wherein the rate of weight loss after heating as observed by keeping under nitrogen atmosphere at a temperature of the melting point of said liquid crystalline polyester+20° C. for 30 minutes is not more than 0.1 wt %, wherein the liquid crystalline polyester is obtained in the presence of an aliphatic sulfonic acid(s) represented by formula (A) below with R being a C$_1$-C$_{12}$ alkyl group:

R—SO$_3$H   (formula A).

10. The liquid crystalline polyester according to claim 9, wherein said structural unit (I) constituted liquid crystalline polyester includes at least a portion of structural unit (IV):

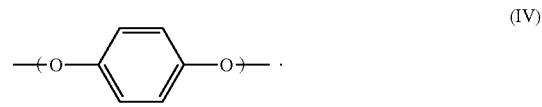 (IV)

11. A liquid crystalline polyester resin composition comprising 10 to 200 parts by weight of a filler with respect to 100 parts by weight of the liquid crystalline polyester according to claim 9.

12. A molded product comprising the liquid crystalline polyester according to claim 9.

13. A molded product comprising the liquid crystalline polyester resin composition according to claim 11.

14. The liquid crystalline polyester according to claim 9, wherein the rate of weight loss after heating as observed by keeping under nitrogen atmosphere at a temperature of the melting point of said liquid crystalline polyester+20° C. for 30 minutes is not more than 0.07 wt %.

* * * * *